United States Patent
Takemura et al.

(10) Patent No.: US 6,180,701 B1
(45) Date of Patent: Jan. 30, 2001

(54) RESIN COMPOSITION AND RESIN MOLDING THEREFROM

(75) Inventors: Kazuya Takemura; Kunihiko Eguchi; Masato Takagi; Taichi Ogawa, all of Chiba (JP)

(73) Assignee: Kawasaki Steel Corporation, Hyogo (JP)

(*) Notice: Under 35 U.S.C. 154(b), the term of this patent shall be extended for 0 days.

(21) Appl. No.: 09/271,582

(22) Filed: Mar. 18, 1999

(30) Foreign Application Priority Data

Apr. 3, 1998 (JP) .................................................. 10-091463

(51) Int. Cl.$^7$ ....................................................... C08K 5/52
(52) U.S. Cl. ........................... 524/127; 524/238; 524/240
(58) Field of Search .................... 524/127, 238, 524/240

(56) References Cited

U.S. PATENT DOCUMENTS

| | | | |
|---|---|---|---|
| 4,452,933 | * 6/1984 | McCready | 524/217 |
| 5,302,646 | * 4/1994 | Vilasagar et al. | 424/127 |
| 5,658,974 | * 8/1997 | Fuhr et al. | 524/127 |
| 5,672,645 | * 9/1997 | Eckek et al. | 524/127 |

FOREIGN PATENT DOCUMENTS

| | | |
|---|---|---|
| 1-017501 | 3/1989 | (JP) . |
| 4-300968 | 10/1992 | (JP) . |
| 8-157664 | 6/1996 | (JP) . |

OTHER PUBLICATIONS

"The Technology and Application of Polymeric Materials", p. 242. Edited by Hitoshi Nishizawa. Published Jul. 23, 1996, in Japanese without translation. Note: This book is referred to in the Specification by the literal translation of the Japanese title, "Technique for Nonflammability of High Polymers and its Application".

\* cited by examiner

*Primary Examiner*—Kriellion Sanders
(74) *Attorney, Agent, or Firm*—Akin, Gump, Strauss, Hauer & Feld, L.L.P.

(57) ABSTRACT

There are provided a resin composition having excellent wear properties and high flame retardancy, and a resin molding that results from melt molding of such composition. The resin composition is essentially comprised of:

(A) a polycarbonate resin;
(B) a modified polyolefin resin;
(C) a compound represented by HOOC—R—$NH_2$ where R is an alkylene, alkylidene, oligomethylene, phenylene or naphthylene group having 5 or more carbon atoms, respectively, wherein each of the phenylene and naphthylene groups may have substituent group; and
(D) a specific phosphate ester.

12 Claims, No Drawings

RESIN COMPOSITION AND RESIN MOLDING THEREFROM

BACKGROUND OF THE INVENTION

1. Field of the Invention

The present invention relates to a resin composition that has excellent wear properties and high flame retardancy and further to a resin molding that is obtainable by melt molding of such composition. In particular, the invention contemplates offering structural materials suited as component parts and casings for use in office automation equipment, household appliances and the like.

2. Description of the Related Art

For its excellent heat resistance, impact resistance and electrical characteristics as well as its good dimensional stability, a polycarbonate resin (hereinafter referred to as a PC resin where needed) has been widely applied to office automation equipment and household appliances especially at their respective portions which are subjected to sliding. Flame retardancy is also required for office automation equipment and household appliances, and therefore, much attention has been focused on making the PC resin nonflammable in nature.

In order to attain nonflammability of the PC resin, one technique is known which is contrived to add to that resin a flame retardant of a bromine type such as biphenyl bromide, tetrabromobisphenol A or the like as disclosed for example at page 242 of "Technique for Nonflammability of High Polymers and its Application" edited by Hitoshi Nishizawa. Another such technique is known in which a phosphate ester compound is incorporated in the PC resin as taught by Japanese Unexamined Patent Publication No. 4-300968.

However, though capable of giving improved flame retardancy to the PC resin, the aforementioned bromine type of flame retardant is liable to evolve dioxins during disposal and incineration of the associated used office automation equipment or household appliance. This eventually invites environmental pollution.

The phosphate ester compound noted above allows the PC resin to be highly flame retardancy but to such an extent that wear properties and impact strength are diminished.

On the other hand, there is proposed a PC-polyolefin resin composition comprised of a PC resin, a polyolefin resin, a modified polyolefin resin and an aminocarboxylic acid as found in Japanese Unexamined Patent Publication No. 8-157664. Such known composition is designed to avoid ply separation or delamination in an effective manner, which defect would be likely to take place when a PC resin and a polyolefin resin are made together into a molded product as by injection molding and because the two resins are, by nature, less compatible with each other. This composition, though highly slidable, is less nonflammable. Moreover, Japanese Examined Patent Publication No. 1-17501 discloses a resin composition comprised of a PC resin and an acrylonitrile-butadiene-styrene copolymer. This type of composition, like the above composition, is excellent in wear properties but unacceptable in flame retardancy.

As is apparent from the foregoing situation of the prior art, no PC type resin compositions have yet been feasible with a proper balance between wear properties and flame retardancy and on an industrial scale.

SUMMARY OF THE INVENTION

For its principal objects, the present invention therefore provides a resin composition that has both excellent wear properties and high flame retardancy, and a resin molding that results from melt molding of such composition.

The present inventors have found that in the case where a polycarbonate resin is incorporated with a compatibilizing agent composed of a modified polyolefin resin and an aminocarboxylic acid and further with a flame retardant composed of a specific phosphate ester, this flame retardant can act not only for flame retardation but also as a sliding agent having a role to render the polycarbonate resin less susceptible to wear at an initial stage of sliding. Thus, it has now been found that when so constituted as to contain a polycarbonate resin, a compatibilizing agent composed of a modified polyolefin resin and an aminocarboxylic acid, and a flame retardant composed of a phosphate ester, a resin composition can be produced having excellent wear properties and high flame retardancy. Those findings have led to the present invention.

More specifically, a first aspect of the present invention provides a resin composition that has excellent wear properties and high flame retardancy, comprising:

(A) a polycarbonate resin;

(B) a modified polyolefin resin;

(C) a compound represented by HOOC—R—NH$_2$ where R is an alkylene, alkylidene, oligomethylene, phenylene or naphthylene group having 5 or more carbon atoms, wherein each of the phenylene and naphthylene groups may have substituent groups; and (D) a compound represented by the following formula (1)

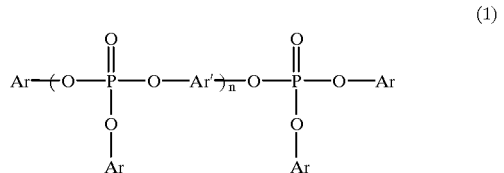

(1)

where Ar is a phenyl group, Ar' is at least one functional group selected from the group consisting of a phenylene group, a biphenylene group and a 2,2-propylidene-diphenylene group, wherein each of Ar and Ar' may have substituent groups, and n is an integer of 0 or above.

In the resin composition according to the first aspect of the invention, it is desired that component (A) be added in an amount of 70 to 97% by weight, component (B) in an amount of 1 to 20% by weight, component (C) in an amount of 0.01 to 5% by weight, and component (D) in an amount of 1 to 10% by weight.

For use as component (B), a polyolefin resin is preferred which has been modified and structured to have polar groups. More preferably, the polar groups are one or more members selected from the group consisting of an acid group such as a carboxylic group, an acid derivative such as an acid anhydride group, and an epoxy group.

A second aspect of the present invention provides a resin composition that has excellent wear properties and high flame retardancy, comprising components (A) to (D) defined above and a polyolefin resin used as component (E).

In the resin composition according to the second aspect of the invention, it is desired that component (A) be added in an amount of 70 to 96% by weight, component (B) in an amount of 1 to 20% by weight, component (C) in an amount of 0.01 to 5% by weight, component (D) in an amount of 1 to 10% by weight, and component (E) in an amount of 1 to 20% by weight.

A third aspect of the present invention provides a resin composition that has excellent wear properties and high flame retardancy, comprising components (A) to (E) defined above and a fluorocarbon resin used as component (F).

In the resin composition according to the third aspect of the invention, it is desired that component (A) be added in an amount of 70 to 96% by weight, component (B) in an amount of 1 to 20% by weight, component (C) in an amount of 0.01 to 5% by weight, component (D) in an amount of 1 to 10% by weight, component (E) in an amount of 1 to 20% by weight, and component (F) in an amount of 0.01 to 2% by weight.

A fourth aspect of the present invention provides a resin composition that has excellent wear properties and high flame retardancy, comprising components (A) to (D) defined above and component (G) that is chosen from a copolymer of an aromatic vinyl compound and a vinyl cyanide compound, a diene rubber, or a graft copolymer of such diene rubber and such copolymer.

In the resin composition according to the fourth aspect of the invention, it is desired that component (A) be added in an amount of 50 to 95% by weight, component (B) in an amount of 1 to 20% by weight, component (C) in an amount of 0.01 to 5% by weight, component (D) in an amount of 1 to 10% by weight, and component (G) in an amount of 2 to 40% by weight.

A fifth aspect of the present invention provides a resin composition that has excellent wear properties and high flame retardancy, comprising components (A) to (D) and components (F) and (G).

In the resin composition according to the fifth aspect of the invention, it is desired that component (A) be added in an amount of 50 to 95% by weight, component (B) in an amount of 1 to 20% by weight, component (C) in an amount of 0.01 to 5% by weight, component (D) in an amount of 1 to 10% by weight, component (F) in an amount of 0.01 to 2% by weight, and component (G) in an amount of 2 to 40% by weight.

A sixth aspect of the present invention provides a resin molding that has excellent wear properties and high flame retardancy, resulting from melt molding of the resin composition according to any one of the first to fifth aspects of the invention.

PREFERRED EMBODIMENTS OF THE INVENTION

The present invention will now be described in greater detail with respect to a resin composition and a resin molding that are intended to be provided by the invention.
First Aspect of the Invention The first aspect of the present invention is directed to a resin composition comprised of components (A) to (D).

Component (A): PC Resin

The PC resin eligible for use as component (A) in the first aspect of the invention is a thermoplastic aromatic polycarbonate polymer which can be obtained by reaction of an aromatic dihydroxyl compound, or of a mixture of such dihydroxyl compound and a polyhydroxyl compound in a small amount with phosgene, carbonic acid or a carbonate diester. Here, the carbonate diester is typified by, for example, diphenyl carbonate and the like.

Suitable examples of the aromatic dihydroxyl compound include 2,2-bis(4-hydroxyphenyl)propane (bisphenol A), tetramethylbisphenol A, tetrabromobisphenol A, bis(4-hydroxyphenyl)-p-diisopropylbenzene, hydroquinone, resorcinol, 4,4'-dihydroxydiphenyl, bis(4-hydroxyphenyl) sulfide, bis(4-hydroxyphenyl)ketone, 1,1-bis(4-hydroxyphenyl)ethane, 1,1-bis(4-hydroxyphenyl)cyclohexane and the like.

Of those aromatic dihydroxyl compounds, bisphenol A is particularly preferable since the resultant resin composition is excellent further in respect of heat resistance, mechanical characteristics, moldability and the like.

The aromatic dihydroxyl compounds listed above may be used singly or in combination of two or more of these compounds. Suitable combinations are those of bisphenol A and tetramethylbisphenol A, and of bisphenol A and tetrabromobisphenol A.

The PC resin for use as component (A) in the present invention is preferably in the range of 1 to 30 g/10 minutes in melt flow rate (MFR) (ASTM D1238, temperature: 280° C., load: 2.16 kg), more preferably of 4 to 20 g/10 minutes. MFRs of less than 1 g/10 minutes render the resulting resin composition less moldable, while MFRs of more than 30 g/10 minutes invite reduced impact strength of the finished molded product.

No particular restriction is imposed on the molecular weight of the PC resin of component (A). However, this resin should have a number-average molecular weight ranging preferably from 1,000 to 100,000 (in terms of polystyrene), more preferably from 5,000 to 40,000. Molecular weights of less than 1,000 bring about a resin composition having decreased characteristics such as of impact strength and the like. Conversely, molecular weights of more than 100,000 lead to reduced moldability of the finished resin composition.

The content of the PC resin for use as component (A) in the resultant resin composition is preferably in the range of 70 to 97% by weight, more preferably of 80 to 97% by weight, still more preferably from 85 to 95% by weight. Contents of less than 70% by weight show a decline in the heat resistance, impact resistance and dimensional stability of the final resin composition. Contents of more than 97% by weight would sometimes be responsible for poor wear properties (e.g., slidability) of the resultant resin composition.

Component (B): Modified Polyolefin Resin

Component (B) is a modified resin of a polyolefin. This modified resin is not particularly restricted so long as it is derived by modification of a pclyolefin resin. Desirably, component (B) is a polyolefin, resin that has been modified and structured to have polar groups.

Polyolefin resins suited for modification are selected from polypropylene type resins and polyethylene type resins such as, for example, crystalline polypropylene homopolymer, crystalline polyethylene-polypropylene block copolymer, crystalline polyethylene-polypropylene random copolymer, high-density polyethylene, low-density polyethylene, linear low-density polyethylene, ultrahigh-molecular polyethylene, flow-type ultrahigh-molecular polyethylene and the like. Among the polyolefin resins illustrated here, high-density polyethylene, low-density polyethylene, linear low-density polyethylene and flow-type ultrahigh-molecular polyethylene are preferred since they contribute greatly to improved wear properties (e.g., slidability) of the finished resin composition.

As stated previously, component (B) should desirably be any one member chosen from the above polyolefin resins and modified to have polar groups. More desirably, the polar groups are one or more functional groups selected from the group consisting of an acid group such as a carboxyl group, an acid derivative such as an acid anhydride group, and an epoxy group.

To be more specific, a modified polyolefin resin is suitably useful as component (B), which modified polyolefin resin is obtainable by copolymerization of one of the foregoing polyolefin resins with a monomer containing a functional group such as an epoxy group, a carboxyl group or an acid anhydride group. In addition, a modified polyolefin resin induced from graft copolymerization can more preferably be used.

Suitable epoxy group-containing monomers are chosen from, for example, glycidyl methacrylate, Abutyl glycidyl maleate, propyl glycidyl fumarate, glycidyl acrylate, N-(4-glycidyloxy-3,5-dimethyl)benzoacrylamide and the like.

Carboxyl group-containing monomers are chosen from acrylic acid, methacrylic acid, maleic acid and the like.

Further, acid anhydride group-containing monomers are chosen from, for example, maleic anhydride, itaconic anhydride, citraconic anhydride and the like.

With reactivity and availability in view, acrylic acid and maleic anhydride are preferred among the polar group-containing monomers illustrated above.

The melt flow rate (MFR) of the modified polyolefin resin is not particularly restricted, but it is desired that such rate be in the range of 0.1 to 60 g/10 minutes (temperature: 230° C., load: 2.16 kg) in the case of polypropylene type resins and of 0.1 to 60 g/10 minutes (temperature: 190° C., load: 2.16 kg) in the case of polyethylene type resins. Smaller MFRs than the above-specified value bring about a resin composition of insufficient moldability, while larger MFRs than the above-specified value lead to lower mechanical strength.

It is thought that, upon reaction with component (C) described later, component (B) would form a compatibilizing agent capable of exhibiting good compatibility with both a PC resin and a polyolefin resin. For this reason, component (A) that is the PC resin and component (B) are highly dispersible with each other so that the resultant resin composition is excellent in wear properties (e.g., slidability). Furthermore, the molded product resulting from such resin composition is significantly resistant to delamination that would arise from inadequate compatibility between the PC resin and the polyolefin resin.

The modified polyolefin resin according to the present invention is producible by any known method. For instance, there may be suitably employed a method wherein a polyolefin resin and a polar group-containing monomer are melt-milled in the presence of or in the absence of a radical initiator and by the use of a dual extruder, a Banbury mixer or a kneader type mill. Use may also be made of a method in which a polyolefin type resin-constituting monomer is copolymerized with a polar group-containing monomer.

The content of the polar group-containing monomer in the modified polyolefin resin is preferably in the range of 0.01 to 10% by weight. Smaller monomer contents than 0.01% by weight make a PC resin and a polyolefin resin less compatible with each other in the resulting resin composition with consequent delamination in the resin molding having resulted from such composition. What is worse, the resin composition would often have insufficiently slidability. Larger monomer contents than 10% by weight involve reduced heat resistance and the like. More preferably, the content of such monomer is in the range of 0.1 to 5% by weight.

The content of component (B) in the resin composition according to the first aspect of the present invention is preferably in the range of 1 to 20% by weight, more preferably of 1 to 15% by weight. Larger contents than 20% by weight produce a resin composition having decreased mechanical strength and heat resistance. Smaller contents than 1% by weight give rise to unacceptable compatibility between the PC resin of component (A) and the modified polyolefin resin of component (B), consequently resulting in delaminated resin moldings. In the latter case, slidableness would in some instances become reduced.

Component (C): compound represented by HOOC—R—NH$_2$

Component (C) is an aminocarboxylic acid represented by HOOC—R—NH$_2$. In this formula, R is an alkylene, alkylidene, oligomethylene, phenylene or naphthylene group having 5 or more carbon atoms, respectively, wherein the phenylene and naphthylene groups may have substituent groups.

Though not particularly restrictive, the upper limit for the number of carbon atoms of R is preferably smaller than 20, more preferably below 12. Compounds of too many carbon atoms are difficult to commercially obtain, and moreover, are liable to make the resulting resin composition less resistant to heat. If the number of carbon atoms is less than 5, then the associated compound is likely to evaporate or sublime in the course of production of a resin composition.

The alkylene group includes, for example, a pentylene group, a hexylene group and the like. The alkylidene group is either one of a straight-chain type, a branched type and an alicyclic type. The oligomethylene is, for example, of a structure having a methylene group linearly bonded in the number of 5 to 20. The phenylene group includes a p-phenylene group, an m-phenylene group, an o-phenylene group, 4,4'-diphenylene group or the like. The naphthylene group includes 2,6-naphthylene group, a 2,7-naphthylene group, 1,5-naphthylene group or the like. Additionally, the phenylene and naphthylene groups may have substituent groups which include, for example, an alkyl group, a carboxyl group, a halogen atom, an amino group, an alkoxyl group or the like.

Specific examples of component (C) are chosen from 6-aminocaproic acid, 7-aminoheptanoic acid, 8-aminooctoic acid, 11-aminoundecanoic acid, p-aminobenzoic acid, m-aminobenzoic acid, 2-amino-6-naphthalenecarboxylc acid, 2-amino-7-naphthalenecarboxylic acid and the like.

It is thought, as mentioned above, that component (B) and component (C) chemically react with each other to thereby form a compatibilizing agent which is composed of a PC resin and a polyolefin resin and is compatible with both of the PC resin and the polyolefin resin. Now, a maleic anhydride-modified polyethylene resin is taken as one example of component (B). This resin would presumably cause a chemical reaction with aminocarboxylic acid for use as component (C) in accordance with the following equsition, thus forming a compatibilizing agent. Component (A) and component (B), therefore, are well dispersed with each other so that the finished resin composition produce enhanced slidability without involving delamination.

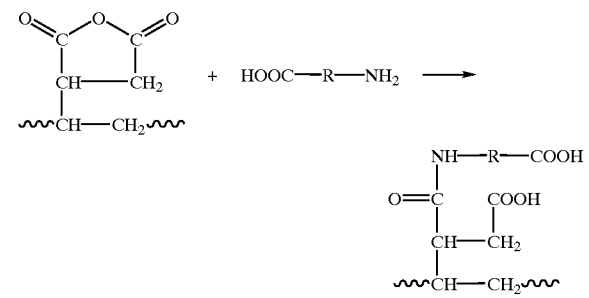

(B) polyethylene resin modified with maleic anhydride
∿∿∿: polyethylene chain

-continued
(C) in the formula shown below, the above polymer abbreviated as ∿∿ COOH compatibilizing agent

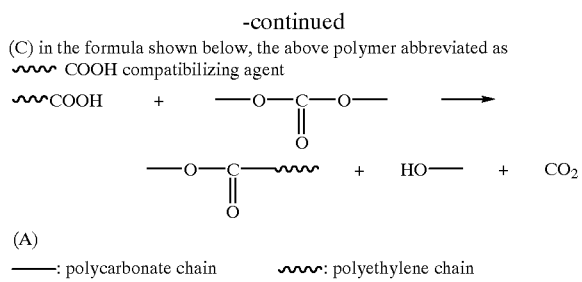

(A)
———: polycarbonate chain    ∿∿∿: polyethylene chain

The content of component (C) in the resin composition according to the first aspect of the present invention is preferably in the range of 0.01 to 5% by weight, more preferably of 0.03 to 1% by weight. Contents of larger than 5% by weight render the resulting resin composition mechanically vulnerable and less resistant to heat. Contents of smaller than 0.01% by weight are responsible for insufficient compatibility between the PC resin of component (A) and the polyolefin resin and hence for adverse delamination and unacceptable wear properties.

Component (D): Phosphate Ester of an Aromatic Type

Component (D) is an aromatic phosphate ester represented by the formula (1) shown below.

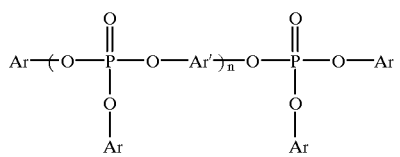

where A is a phenyl group, Ar' is at least one functional group selected from the group consisting of a phenylene group, a biphenylene group and a 2,2-propylidene-diphenylene group, wherein each of Ar and Ar' may have substituent groups, and n is an integer of 0 or above.

In the resin composition according to the first aspect of the present invention, an aromatic phosphate ester represented by the above formula (1) is added as component (D) so that high flame retardancy can be attained. The aromatic phosphate ester of the formula (1) is rather high in boiling point and hence superior in heat stability, and is less likely to vaporize while in melt kneading and in molding. Furthermore, because of its aromatic character, such compound is readily dispersible in the PC resin of component (A), i.e., the chief component of the resin composition, with the result that it is effective in imparting nonflammability to the resin composition. Also advantageously, such specific aromatic phosphate ester is conducive to decreased wear of the resin composition at an initial stage of sliding and is capable of giving enhanced slidability to the resin composition. In consequence of addition of the aromatic phosphate ester of the formula (1), the resin composition according to the first aspect of the invention can simultaneously ensure high flame retardancy and excellent wear properties.

Component (D) may be a single compound or a mixture of compounds having varied values of n. In the case of such mixture, the content of a monomer of n=1 is preferably not more than 40% by weight based on the total weight of component (D).

Suitable aromatic phosphate esters include triphenyl phosphate, resorcinol-bis(diphenyl phosphate), resorcinol-bis(diethylphenyl phosphate), resorcinol-bis(dimethylphenyl phosphate), bisphenol A-bis(dicresyl phosphate) or the like. Preferred among these compounds are a mixture of triphenyl phosphate and resorcinol-bis(diphenyl phosphate) and a mixture of triphenyl phosphate and bisphenol A-bis(dicresyl phosphate) as they are easily available and highly capable of making the resultant resin composition highly flame retardant.

The content of component (D) in the resin composition according to the first aspect of the present invention is preferably in the range of 1 to 10% by weight, more preferably of 1 to 5% by weight. Larger contents than 10% by weight invite deteriorated mechanical strength, especially reduced impact strength, whereas smaller contents than 1% by weight tend to suffer from insufficient flame retardancy.

Second Aspect of the Invention

The second aspect of the present invention is directed to a resin composition comprised of components (A) to (D) and further of component (E).

By further addition of component (E), the resulting resin composition has superior wear properties (e.g., slidability).

In the second aspect of the invention, there can be used the same components of (A) to (D) as stated above in connection with the first aspect of the invention.

Component (E): Polyolefin Resin

A polyolefin resin for use as component (E) in the resin composition according to the second aspect of the present invention may be of the same kind and the same MFR as described above with respect to component (B). The polyolefin resin of component (E) should be of an unmodified nature.

In the second aspect of the invention, component (A) is added preferably in an amount of 70 to 96% by weight, more preferably of 80 to 96% by weight, still more preferably of 85 to 95% by weight, component (B) is added preferably in an amount of 1 to 20% by weight, more preferably of 1 to 15% by weight, component (C) is added preferably in an amount of 0.01 to 5% by weight, more preferably of 0.03 to 1% by weight, component (D) is added preferably in an amount of 1 to 10% by weight, more preferably of 1 to 5% by weight, and component (E) is added preferably in an amount of 1 to 20% by weight, more preferably of 1 to 15% by weight. Strict observance of the above-specified amounts of components (A) to (E) gains a good balance between wear properties, impact resistance, mechanical strength, dimensional stability and flame retardancy and also precludes delamination to a great extent.

Third Aspect of the Invention

The third aspect of the present invention is directed to a resin composition comprised of components (A) to (E) and further of component (F).

By further addition of component (F), the resulting resin composition has still further improved wear properties (slidability). In addition and advantageously, component (F) is effective to preclude dripping during combustion, thus preventing flame spreading and allowing such composition to be high flame retardant.

In the third aspect of the invention, there can be employed the same components of (A) to (E) as described above in connection with the first and second aspects of the invention.

Component (F): Fluorocarbon Resin

A fluorocarbon resin taken as component (F) is not particularly restricted so long as it is composed of a fluorine atom-containing resin. The fluorocarbon resin is chosen from, for example, polytetrafluoroethylene (PTFE), tetrafluoroethylene-perfluoroalkylvinyl ether copolymer (PFA), tetrafluoroethylene-hexafluoropropylene copolymer (FEP), tetrafluoroethylene-ethylene copolymer (ETFE), polyvinylidene fluoride (PVdF), polychlorotrifluoroethylene (PCTFE), polyvinyl fluoride (PVF) and the like. Among the resins listed here, PTFE and PFA are preferred, each of which has a higher melting point than the molding temperature (about 300° C.) of the PC resin. It is thought that, due to their respective higher melting points, the two fluorocarbon resins would disperse during kneading and molding without melting, and this dispersion is presumed to enhance wear properties and flame retardancy. In contrast, upon melting during kneading and molding without undergoing dispersion, a fluorocarbon resin presents a massive lump so that a resin molding resulting from the finished resin composition would presumably become readily delaminated.

In the third aspect of the present invention, component (A) is added preferably in an amount of 70 to 96% by weight, more preferably of 80 to 96% by weight, still more preferably of 85 to 95% by weight, component (B) is added preferably in an amount of 1 to 20% by weight, more preferably of 1 to 15% by weight, component (C) is added preferably in an amount of 0.01 to 5% by weight, more preferably of 0.03 to 1% by weight, component (D) is added preferably in an amount of 1 to 10% by weight, more preferably of 1 to 5% by weight, component (E) is added preferably in an amount of 1 to 20% by weight, more preferably of 1 to 15% by weight, and component (F) is added preferably in an amount of 0.01 to 2% by weight, more preferably of 0.03 to 0.5% by weight. Observance of the above-specified amounts of components (A) to (F) keeps a proper balance between wear properties (slidability), impact resistance, mechanical strength, dimensional stability, heat resistance and flame retardancy, and also lessens delamination to a large extent. Additionally, component (F) when in the above range can greatly prevent dripping and hence evolves a minimum of hydrogen fluoride gas during disposal and incineration of the associated used resin molding.

Fourth Aspect of the Invention

The fourth aspect of the present invention is directed to a resin composition comprised of components (A) to (D) and further of component (G).

By further addition of component (G), the resultant resin composition has still further improved wear properties (slidability).

In the fourth aspect of the invention, there can be used the same components (A) to (D) as described above in connection with the first aspect of the invention.

Component (G): resin containing a copolymer of an aromatic vinyl compound and a vinyl cyanide compound, a diene type rubber and a graft polymer of such rubber and such copolymer Component (G) is a resin containing at least a copolymer of an aromatic vinyl compound and a vinyl cyanide compound, a diene type rubber and a copolymer of an aromatic vinyl compound grafted to such diene type rubber and a vinyl cyanide compound.

The diene type rubber is chosen suitably from polybutadiene, butadiene-styrene copolymer, butadiene-acrylonitrile copolymer, polyisoprene, ethylene-propylene rubber, EPDM and the like.

The content of the diene type rubber is preferably in the range of 10 to 80% by weight, more preferably of 40 to 80% by weight, based on the total weight of component (G). Contents of not more than 10% by weight result in reduced impact strength.

The aromatic vinyl compound for use in component (G) includes styrene, substituted styrene, and a mixture thereof. By the substituted styrene is meant by a styrene compound substituted with a substituent selected from the group consisting of an alkyl group of 1 to 5 carbon atoms and a halogen atom such as chlorine, bromine and the like. Specific examples of the aromatic vinyl compound include styrene (not substituted), α-methylstyrene, dibromostyrene and a mixture thereof.

The vinyl cyanide compound is chosen suitably from acrylonitrile and methacrylonitrile.

The copolymer of an aromatic vinyl compound and a vinyl cyanide compound is derived from styrene and acrylonitrile and having a weight ratio of styrene to acrylonitrile preferably of more than 1:1, more preferably of more than 3:1.

Specific examples of the resin prepared to contain a copolymer of an aromatic vinyl compound and a vinyl cyanide compound, a diene type rubber, and a graft polymer of such rubber and such copolymer are chosen from ABS resin, AES resin, AAS resin, ACS resin, ABS-PVC resin and the like.

In the forth aspect of the preset invention, component (A) is added preferably in an amount of 50 to 95% by weight, more preferably of 54 to 93% by weight, component (B) is added preferably in an amount of 1 to 20% by weight, more preferably of 1 to 15% by weight, component (C) is added preferably in an amount of 0.01 to 5% by weight, more preferably of 0.03 to 1% by weight, component (D) is added preferably in an amount of 1 to 10% by weight, more preferably of 1 to 5% by weight, and component (G) is added preferably in an amount of 2 to 40% by weight, more preferably of 10 to 30% by weight. When the above-specified amounts of components (A) to (D) and (G) are observed, a proper balance is gained between wear properties, impact strength, mechanical strength, dimensional stability, heat resistance and flame retardancy. Delamination can also be decreased to a great extent. Component (G) in the above range is conducive to excellent moldability.

Fifth Aspect of the Invention

The fifth aspect of the present invention is directed to a resin composition comprised of components (A) to (D) and (G) and further of component (F).

By further addition of component (E) to components (A) to (D) and (G), the resultant resin composition has still more noticeably improved wear properties and flame retardancy.

In the fifth aspect of the invention, there can be employed the same components (A) to (D) and (G) as stated above in connection with the fourth aspect of the invention. In addition, there may be used the same component (F) as described above with regard to the third aspect of the invention.

In the fifth aspect of the invention, component (A) is added preferably in an amount of 50 to 95% by weight, more preferably of 54 to 93% by weight, component (B) is added preferably in an amount of 1 to 20% by weight, more preferably of 1 to 15% by weight, component (C) is added preferably in an amount of 0.01 to 5% by weight, more preferably of 0.03 to 1% by weight, component (D) is added preferably in an amount of 1 to 10% by weight, more preferably of 1 to 5% by weight, component (F) is added preferably in an amount of 0.01 to 2% by weight, more preferably of 0.03 to 0.5% by weight, and component (G) is added preferably in an amount of 2 to 40% by weight, more preferably of 10 to 30% by weight. When the above-specified amounts of components (A) to (D), (F) and (G) are followed, a good balance is made attainable between wear properties, impact strength, mechanical strength, dimensional stability, heat resistance and flame retardancy. Delamination is greatly reduced, and hence, moldability is improved. Also advantageously, dripping is greatly effectively lessened, with less hydrogen fluoride gas evolved at the time the associated used resin molding is disposed and incinerated.

Process for Producing the Resin Compositions of the Invention

No particular restriction is placed upon the process for producing the resin compositions (hereinbelow called the resin compositions of the invention) according to the first to fifth aspects of the present invention. One suitable production process can be illustrated in which component (B) and component (C) are reacted in advance as by melt kneading in order to prepare a compatibilizing agent having compatibility with both of a PC resin and a polyolefin resin, followed by addition of the remaining components and by subsequent melt kneading of the system.

Namely, according to a process suited for use in the resin composition of the first aspect of the invention, component (B) and component (C) are melt-kneaded in advance to thereby prepare a melt-kneaded product to which component (A) and component (D) are then added in optional order or simultaneously, followed by melt kneading of the whole system. Into a compatibilizing agent prepared by reaction of component (B) and component (C) and remaining in a molten state, component (A) and component (D) may be incorporated, and the system may be melt-kneaded. Alternatively, a compatibilizing agent in a solid state may be mixed with component (A) and component (D) and thereafter subjected to melt kneading.

According to a process suited for the resin composition of the second aspect of the invention, component (B) and component (C) are melt-kneaded in advance to thereby prepare a melt-kneaded product to which component (A), component (D) and component (E) are then added in optional order or simultaneously, followed by melt kneading of the system. Into a compatibilizing agent prepared by reaction of component (B) and component (C) and held in a molten state, component (A), component (D) and component (E) may be incorporated, and the system may be melt-kneaded. Alternatively, a compatibilizing agent in a solid state may be mixed with component (A), component (D) and component (E) and thereafter subjected to melt kneading.

According to a process suited for the resin composition of the third aspect of the invention, component (B) and component (C) are melt-kneaded to thereby prepare a melt-kneaded product to which component (A), component (D), component (E) and component (F) are then added in optional order or simultaneously, followed by melt kneading of the system. Into a compatibilizing agent prepared by reaction of component (B) and component (C) and held in a molten state, component (A), component (D), component (E) and component (F) may be incorporated, and the system may be melt-kneaded. In alternative manner, a compatibilizing agent in a solid state may be mixed with component (A), component (D), component (E) and component (F) and subsequently subjected to melt kneading.

According to a process suited for the resin composition of the fourth aspect of the invention, component (B) and component (C) are melt-kneaded in advance to thereby prepare a melt-kneaded product to which component (A), component (D) and component (G) are then added in optional order or simultaneously, followed by melt kneading of the system. Into a compatibilizing agent prepared by reaction of component (B) and component (C) and held in a molten state, component (A), component (D) and component (G) may be incorporated, and the system may be melt-kneaded. Alternatively, a compatibilizing agent in a solid state may be mixed with component (A), component (D) and component (G) and thereafter subjected to melt kneading.

According to a process suited for the resin composition of the fifth aspect of the invention, component (B) and component (C) are melt-kneaded to prepare a melt-kneaded product to which component (A), component (D), component (F) and component (G) are then added in optional order or simultaneously, followed by melt kneading of the system. Into a compatibilizing agent prepared by reaction of component (B) and component (C) and held in a molten state, component (A), component (D), component (F) and component (G) may be incorporated, and the system may be melt-kneaded. Alternatively, a solid compatibilizing agent may be mixed with component (A), component (D), component (F) and component (G) and then subjected to melt kneading.

To carry out melt kneading, use may be made of, for example, a single-screw extruder, a twin-screw extruder, a kneader, a Brabender mixer or the like. Melt-kneading temperatures range preferably from 230 to 320° C., more preferably from 250 to 300° C. Lower temperatures than 230° C. lead to low rates of reaction and hence result in insufficient reactions. Higher temperatures than 320° C. invite extremely deteriorated resin, thus showing a sharp decline in the desired characteristics.

The resin compositions of the resent invention thus constituted and produced exhibit those advantages described below.

All of the resin compositions of the first to fifth aspects of the invention have excellent wear properties and high flame retardancy and also have excellent impact strength, mechanical strength, dimensional stability, heat resistance and delamination resistance.

In the resin composition of the second aspect of the invention wherein component (E) has been added to components (A) to (D), slidability is further enhanced.

In the resin composition of the third aspect of the invention wherein component (F) has been added to components (A) to (E), dripping is prevented during combustion with flame spreading avoided so that flame retardancy is further improved. In spite of use of a fluorocarbon resin, the resin composition even on incineration evolves less hydrogen fluoride gas, consequently protecting environmental safety.

In the resin composition of the fourth aspect of the invention wherein component (G) has been added to components (A) to (G), slidability is still further improved.

In the resin composition of the fifth aspect of the invention wherein components (A) to (D), (E) and (G) have been added together, slidability and flame retardancy are still further improved.

Resin Moldings and Process for Producing the Same

Resin moldings (hereinbelow called the resin moldings of the invention), which are constituted as a sixth aspect of the present invention, can be produced by melt molding of one selected resin composition of the present invention, such melt molding being commonly used for molding thermoplastic resins. These resin moldings may be of an optional shape. Modes of melt molding may be, for example, injection, extrusion or the like. Molding temperatures are preferably in the range of 230 to 320° C., more preferably of 250 to 300° C.

As sated above, the resin moldings of the invention ay be formed in any desired shape in which are included a film or a sheet-like molding and a laminated molding.

The resin moldings of the invention use, as starting materials, the resin compositions of the first to fifth aspects of the invention, and therefore, have excellent wear properties, flame retardancy, mechanical strength, heat resistance and appearance (freedom from delamination). Moreover, such resin moldings have those characteristics depending on and accruing from the respective resin compositions of the invention. The resin moldings of the invention are suitable as parts for office automation equipment, household appliances, medical equipment and the like. They are particularly suitable for use as automotive parts such as gears, cams, bearings and the like.

When it is found desirable, the resin compositions and resin moldings of the present invention may be incorporated with various other additives such as glass fiber, carbon fiber, talc, mica, calcium carbonate, carbon black and the like, and thermoplastic resins such as silicone resin, polyalkylene terephthalate, nylon, polyphenylene ether, polystyrene and the like.

The following examples are provided to further illustrate the present invention. However, these examples should not be construed as limiting the invention. Those starting materials, apparatus and determination methods used in the examples are indicated below.

Starting Materials (1) Component (A)

polycarbonate resin (PC): Caribre 351-6, Sumitomo Dow Co. (MFR=6 g/10 minutes)

(2) Component (B)

maleic anhydride-modified polyethylene (MUPE): Fusabond MB2260, Mitsui DuPont polychemical Co.

epoxy-modified polypropylene (EPP): C-900X, Tohnen Chemical Co.

maleic anhydride-modified polypropylene (MUPP): Admer QF550, Mitsui Petrochemical Co.

(3) Component (C)

aminocaproic acid (AC): Wako Pure Chemical Co.

aminoundecanoic acid (AU): Wako Pure Chemical Co.

p-aminobenzoic acid (PAB): Wako Pure Chemical Co.

(4) Component (D)

mixture of resorcinol bis-diphenyl phosphate and triphenyl phosphate (DP): Reophos ROP, Ajinomoto Co.

triphenyl phosphate (TPP): Reophos TPP, Ajinomoto Co.

mixture of triphenyl phosphate and bisphenol A-bis (dicresyl phosphate) (CR): CR741C, Daihachi Chemical Co.

(5) Component (E)

linear low-density polyethylene (LLDPE): Am1720, Nippon Petrochemical Co.

PP-PB block copolymer (PP-PE): AW541, Sumitomo Chemical Co.

Flow-type ultrahigh-molecular polyethylene (UHWPE): Lubmer, Mitsui Chemical Co.

(6) Component (F)

polytetrafluoroethylene (PTPE): Polyflon TFE, Daikin Industries Co.

tetrafluoroethylene-perfluoroalkylvinyl ether copolymer (PFA): Neoflon, Daikin Industries Co.

(7) Component (G)

ABS resin (ABS): GA701, Sumitomo Dow Co.

AES resin (AES): UB500A, Sumitomo Dow Co.

Melt Kneading

Nippon Seikosho Co., twin-screw extruder (TEX 30), cylinder temperature 300° C.

Injection Molding

Yamagi Seiki Co., injection molding machine SANJECT 3601, cylinder temperature 295° C., mold temperature 90 to 110° C.

Characteristic Determination (1) Flame Retardancy

Measurement was made in accordance with UL-94 Standards and with use of an ASTM bending specimen of 1/16". Four different levels of V-0, V-1, V-2 and NG define the criteria for combustibility, and V-0 denotes highest nonflammability.

(2) Specific Wear

ASTM-D3702 was followed.

(3) Izod Impact Strength

Measurement was made in accordance with ASTM-D256 and with use of a notched specimen.

EXAMPLE 1

By the use of a mixer, 3 kg of a maleic anhydride-modified polyethylene (component (B), MUPE, Fusabond MB226D, Mitsui DuPont Chemical Co.) and 0.03 kg of aminocaproic acid (component (C), AC) were sufficiently mixed. The resultant mixture was kneaded by means of a twin-screw extruder, TEX30, manufactured by Nippon Seikosho Co. and at a cylinder temperature of 300° C., whereby a pellet A was prepared.

Subsequently, 0.303 kg (component (B) 0.3 kg and component (C) 0.0003 kg contained) of the pellet A, 9.497 kg of a polycarbonate resin (component (A), PC) and 0.2 kg of a phosphate ester (component (D), RDP, Reophos RDP, Ajinomoto Co.) were fully mixed in a mixer, followed by kneading of the resulting mixture with use of a twin-screw extruder, TEX30, manufactured by Nippon Seikosho Co. and at a cylinder temperature of 300° C. Thus, a pellet B was obtained.

After being dried at 120° C. for 5 hours, the pellet B was molded with use of an injection molding machine, SAN-JECT 3601, manufactured by Yamagi Seiki Co., at a cylinder temperature of 295° C. and at a mold temperature of 90 to 110° C., whereby a given resin molding (test piece) was produced. The test piece was measured in respect of nonflammability, specific wear and impact strength with the results shown in Table 2.

EXAMPLES 2 TO 28 AND COMPARATIVES EXAMPLES 1 TO 7

In the same manner as in Example 1, components of (B) and components of (C) formulated and tabulated in Table 1 and in Table 3 were melt-kneaded to prepare pellets A.

Each pellet A was mixed with other components such that it was so formulated as shown in Table 1 and Table 3. Melt kneading wad conducted as in Example 1 so that a pellet B was obtained.

As in Example 1, the pellet B was injection-molded to produce a test piece which was then measured in regard to nonflammability, specific wear and impact strength with the results shown in Table 2 and Table 4.

TABLE 2

| No | Flame retardancy | Specific wear $(m^3/Nm) \times 10^{-15}$ | Izod impact strength (kgfcm/cm) |
|---|---|---|---|
| Example 1 | V-2 | 1.9 | 75.6 |
| Example 2 | V-2 | 3.8 | 72.3 |
| Example 3 | V-2 | 3.6 | 71.2 |
| Example 4 | V-2 | 1.8 | 76.8 |
| Example 5 | V-2 | 1.9 | 78.2 |
| Example 6 | V-2 | 2.5 | 71.2 |
| Example 7 | V-2 | 2.1 | 74.8 |
| Example 8 | V-1 | 3.5 | 82.6 |
| Example 9 | V-2 | 0.9 | 68.3 |
| Example 10 | V-2 | 2.2 | 78.9 |
| Example 11 | V-2 | 1.6 | 72.8 |
| Example 12 | V-2 | 2.5 | 79.8 |
| Example 13 | V-1 | 1.6 | 70.5 |
| Example 14 | V-2 | 1.2 | 70.5 |
| Example 15 | V-2 | 2.3 | 73.5 |
| Example 16 | V-2 | 1.2 | 75.3 |
| Example 17 | V-2 | 3.2 | 79.3 |
| Example 18 | V-2 | 0.9 | 68.5 |
| Example 19 | V-0 | 0.8 | 70.5 |
| Example 20 | V-0 | 0.7 | 72.3 |
| Example 21 | V-0 | 0.9 | 73.5 |
| Example 22 | V-0 | 0.7 | 72.4 |
| Example 23 | V-2 | 1.6 | 63.8 |
| Example 24 | V-2 | 1.9 | 59.2 |
| Example 25 | V-2 | 2.3 | 73.2 |
| Example 26 | V-2 | 1.8 | 56.8 |

TABLE 1

| | Component A | | Component B | | Component C | | Component D | | Component E | | Component F | | Component G | |
|---|---|---|---|---|---|---|---|---|---|---|---|---|---|---|
| No | Kind | Content wt. % | Kind | Content wt. % | Kind | Content wt. % | Kind | Content wt. % | Kind | Content wt. % | Kind | Content wt. % | Kind | Content wt. % |
| Example 1 | PC | 94.97 | MUPE | 3 | AC | 0.03 | RDP | 2 | — | 0 | — | 0 | — | 0 |
| Example 2 | PC | 94.97 | EPP | 3 | AC | 0.03 | RDP | 2 | — | 0 | — | 0 | — | 0 |
| Example 3 | PC | 94.97 | MUPP | 3 | AC | 0.03 | RDP | 2 | — | 0 | — | 0 | — | 0 |
| Example 4 | PC | 94.97 | MUPE | 3 | AU | 0.03 | RDP | 2 | — | 0 | — | 0 | — | 0 |
| Example 5 | PC | 94.97 | MUPE | 3 | PAB | 0.03 | RDP | 2 | — | 0 | — | 0 | — | 0 |
| Example 6 | PC | 94.97 | MUPE | 3 | AC | 0.03 | CR | 2 | — | 0 | — | 0 | — | 0 |
| Example 7 | PC | 94.97 | MUPE | 3 | AC | 0.03 | TPP | 2 | — | 0 | — | 0 | — | 0 |
| Example 8 | PC | 96.97 | MUPE | 1 | AC | 0.03 | RDP | 2 | — | 0 | — | 0 | — | 0 |
| Example 9 | PC | 77.97 | MUPE | 20 | AC | 0.03 | RDP | 2 | — | 0 | — | 0 | — | 0 |
| Example 10 | PC | 94.99 | MUPE | 3 | AC | 0.01 | RDP | 2 | — | 0 | — | 0 | — | 0 |
| Example 11 | PC | 90.00 | MUPE | 3 | AC | 5 | RDP | 2 | — | 0 | — | 0 | — | 0 |
| Example 12 | PC | 95.97 | MUPE | 3 | AC | 0.03 | RDP | 1 | — | 0 | — | 0 | — | 0 |
| Example 13 | PC | 86.97 | MUPE | 3 | AC | 0.03 | RDP | 10 | — | 0 | — | 0 | — | 0 |
| Example 14 | PC | 89.97 | MUPE | 3 | AC | 0.03 | RDP | 2 | LLDPE | 5 | — | 0 | — | 0 |
| Example 15 | PC | 89.97 | MUPE | 3 | AC | 0.03 | RDP | 2 | PP-PE | 5 | — | 0 | — | 0 |
| Example 16 | PC | 89.97 | MUPE | 3 | AC | 0.03 | RDP | 2 | UHWPE | 5 | — | 0 | — | 0 |
| Example 17 | PC | 93.97 | MUPE | 3 | AC | 0.03 | RDP | 2 | LLDPE | 1 | — | 0 | — | 0 |
| Example 18 | PC | 74.97 | MUPE | 3 | AC | 0.03 | RDP | 2 | LLDPE | 20 | — | 0 | — | 0 |
| Example 19 | PC | 88.97 | MUPE | 3 | AC | 0.03 | RDP | 2 | LLDPE | 5 | PTFE | 1 | — | 0 |
| Example 20 | PC | 88.97 | MUPE | 3 | AC | 0.03 | RDP | 2 | LLDPE | 5 | PFA | 1 | — | 0 |
| Example 21 | PC | 89.96 | MUPE | 3 | AC | 0.03 | RDP | 2 | LLDPE | 5 | PTFE | 0.01 | — | 0 |
| Example 22 | PC | 87.97 | MUPE | 3 | AC | 0.03 | RDP | 2 | LLDPE | 5 | PTFE | 2 | — | 0 |
| Example 23 | PC | 74.97 | MUPE | 3 | AC | 0.03 | RDP | 2 | — | 0 | — | 0 | ABS | 20 |
| Example 24 | PC | 74.97 | MUPE | 3 | AC | 0.03 | RDP | 2 | — | 0 | — | 0 | AES | 20 |
| Example 25 | PC | 90.97 | MUPE | 3 | AC | 0.03 | RDP | 2 | — | 0 | — | 0 | ABS | 4 |
| Example 26 | PC | 54.97 | MUPE | 3 | AC | 0.03 | RDP | 2 | — | 0 | — | 0 | ABS | 40 |
| Example 27 | PC | 73.97 | MUPE | 3 | AC | 0.03 | RDP | 2 | — | 0 | PTFE | 1 | ABS | 20 |
| Example 28 | PC | 73.97 | MUPE | 3 | AC | 0.03 | RDP | 2 | — | 0 | PFA | 1 | ABS | 20 |

TABLE 2-continued

| No | Flame retardancy | Specific wear (m³/Nm) × 10⁻¹⁵ | Izod impact strength (kgfcm/cm) |
|---|---|---|---|
| Example 27 | V-1 | 1.5 | 56.2 |
| Example 28 | V-1 | 1.4 | 59.8 |

TABLE 3

| No | Component A | | Component B | | Component C | | Component D | | Component E | | Component F | | Component G | |
|---|---|---|---|---|---|---|---|---|---|---|---|---|---|---|
| | Kind | Content wt. % | Kind | Content wt. % | Kind | Content wt. % | Kind | Content wt. % | Kind | Content wt. % | Kind | Content wt. % | Kind | Content wt. % |
| Comparative Example 1 | PC | 96.97 | MUPE | 3 | AC | 0.03 | — | 0 | — | 0 | — | 0 | — | 0 |
| Comparative Example 2 | PC | 91.97 | MUPE | 3 | AC | 0.03 | — | 0 | LLDPE | 5 | — | 0 | — | 0 |
| Comparative Example 3 | PC | 90.97 | MUPE | 3 | AC | 0.03 | — | 0 | LLDPE | 5 | PTFE | 1 | — | 0 |
| Comparative Example 4 | PC | 76.97 | MUPE | 3 | AC | 0.03 | — | 0 | — | 0 | — | 0 | ABS | 20 |
| Comparative Example 5 | PC | 75.97 | MUPE | 3 | AC | 0.03 | — | 0 | — | 0 | PTFE | 1 | ABS | 20 |
| Comparative Example 6 | PC | 97.97 | — | 0 | AC | 0.03 | RDP | 2 | — | 0 | — | 0 | — | 0 |
| Comparative Example 7 | PC | 95.00 | MUPE | 3 | — | 0 | RDP | 2 | — | 0 | — | 0 | — | 0 |

TABLE 4

| No | Flame retardancy | Specific wear (m³/Nm) × 10⁻¹⁵ | Izod impact strength (kgfcm/cm) | Remark |
|---|---|---|---|---|
| Comparative Example 1 | NG | 2.4 | 72.8 | |
| Comparative Example 2 | NG | 1.6 | 70.8 | |
| Comparative Example 3 | NG | 1.2 | 72.9 | |
| Comparative Example 4 | NG | 3.2 | 62.5 | |
| Comparative Example 5 | NG | 2.9 | 59.8 | |
| Comparative Example 6 | V-2 | 123.0 | 62.8 | Slightly delaminated |
| Comparative Example 7 | V-2 | 6.2 | 58.2 | |

As is clear from Table 1 to Table 4, all of the resin compositions of the present invention typified by various examples have been found to have excellent wear properties and high flame retardancy with a minimal decline in impact strength. In particular, addition of a phosphate ester for use as component (D) is conducive to not only improved flame retardancy but also enhanced slidability (that is, reduced specific wear). This is apparent, for instance, from comparison of Example 1 to Comparative Example 1, Example 14 to Comparative Example 2, Example 19 to Comparative Example 3, Example 23 to Comparative Example 4, and Example 27 to Comparative Example 5. Further, delamination was tested with respect to the resin moldings by bonding a cellophane adhesive tape (Cellotape CT12S, Nichiban Co.) to the surface of each test molding, followed by releasing of the tape from the molding and by inspection of the tape as to whether the molding had become delaminated. Examples 1 to 28 and Comparative Examples 1 to 6 were free of delamination, while Comparative Example 7 slightly delaminated.

According to the present invention, there is provided a nonflammable slidable resin composition of high performance that has excellent wear properties and high flame retardancy. Such resin composition is free of from bromine type flame retardants and hence is less apt to produce poisonous substances even upon disposal and incineration, if so, in negligibly small amounts. This means that the resin composition can meet with forthcoming stringent environmental regulations. The resin composition of the invention is useful as a starting material for component parts (gears, cams and the like) and casings in office automation equipment, household appliances and the like. Additionally, the resin moldings of the invention derivable from the above specific resin composition are suitable as component parts (gears, cams and the like) and casings for office automation equipment, household appliances and the like. In this instance, those characteristics exhibited inherently by the resin composition can be used to advantage.

What is claimed is:

1. A resin composition comprising:

(A) a polycarbonate resin;

(B) a modified polyolefin resin;

(C) a compound represented by HOOC—R—NH$_2$ where R is an alkylene, alkylidene, oligomethylene, phenylene or naphthylene group having 5 or more carbon atoms, respectively, wherein the phenylene and naphthylene groups may have substituent groups; and (D) a compound represented by the following formula (1)

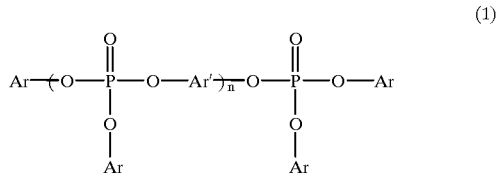

(1)

where Ar is a phenyl group, Ar' is at least one functional group selected from the group consisting of a phenylene group, a biphenylene group and a 2,2-propylidenediphenylene group, wherein each of Ar and Ar' may have substituent groups, and n is an integer of 0 or above.

2. The resin composition according to claim 1, wherein component (A) is added in an amount of 70 to 97% by weight, component (B) is added in an amount of 1 to 20% by weight, component (C) is added in an amount of 0.01 to 5% by weight, and component (D) is added in an amount of 1 to 10% by weight.

3. The resin composition according to claim 1, further comprising:

(E) an unmodified polyolefin resin.

4. The resin composition according to claim 3, wherein component (A) is added in an amount of 70 to 96% by weight, component (B) is added in an amount of 1 to 20% by weight, component (C) is added in an amount of 0.01 to 5% by weight, component (D) is added in an amount of 1 to 10% by weight, and component (E) is added in an amount of 1 to 20% by weight.

5. The resin composition according to claim 1, further comprising:

(E) an unmodified polyolefin resin; and (F) a fluorocarbon resin.

6. The resin composition according to claim 5, wherein component (A) is added in a amount of 70 to 96% by weight, component (B) is added in an amount of 1 to 20% by weight, component (C) is added in an amount of 0.01 to 5% by weight, component (D) is added in an amount of 1 to 10% by weight, component (E) is added in an amount of 1 to 20% by weight, and component (F) is added in an amount of 0.01 to 2% by weight.

7. The resin composition according to claim 1, further comprising:

(G) a resin containing a copolymer of an aromatic vinyl compound and a vinyl cyanide compound, a diene type rubber, and a graft polymer of the rubber and the copolymer.

8. The resin composition according to claim 7, wherein component (A) is added in an amount of 50 to 95% by weight, component (B) is added in an amount of 1 to 20% by weight, component (C) is added in an amount of 0.01 to 5% by weight, component (D) is added in an amount of 1 to 10% by weight, and component (G) is added in an amount of 2 to 40% by weight.

9. The resin composition according to claim 1, further comprising:

(F) a fluorocarbon resin; and (G) a resin containing a copolymer of an aromatic vinyl cyanide compound, a diene type rubber, and a graft polymer of the rubber and the copolymer.

10. The resin composition according to claim 9, wherein component (A) is added in an amount of 50 to 95% by weight, component (B) is added in an amount of 1 to 20% by weight, component (C) is added in an amount of 0.01 to 5% by weight, component (D) is added in an amount of 1 to 10% by weight, component (F) is added in an amount of 0.01 to 2% by weight, and component (G) is added in an amount of 2 to 40% by weight.

11. A resin molding resulting from melt molding of the resin composition according to any one of claims 1 to 10.

12. The resin composition according to claim 1, wherein component (B) is a polyolefin resin modified with at least one functional group selected from the group consisting of a carboxylic acid, an acid anhydride and an epoxy group.

* * * * *